United States Patent
Chang et al.

(10) Patent No.: US 7,349,359 B2
(45) Date of Patent: Mar. 25, 2008

(54) SYSTEM AND METHOD FOR SYNCHRONIZING BROADCAST/MULTICAST SERVICE CONTENT FRAMES IN A MOBILE COMMUNICATION SYSTEM

(75) Inventors: Yong Chang, Seongnam-si (KR);
Jun-Hyuk Song, Anyang-si (KR);
Nae-Hyun Lim, Seoul (KR);
Dae-Gyun Kim, Seongnam-si (KR);
Ji-Hae Yi, Suwon-si (KR); Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 10/938,513

(22) Filed: Sep. 13, 2004

(65) Prior Publication Data
US 2005/0058090 A1    Mar. 17, 2005

(30) Foreign Application Priority Data
Sep. 13, 2003    (KR)    ............ 10-2003-0063471

(51) Int. Cl.
*H04L 12/56*    (2006.01)

(52) U.S. Cl. .............. 370/312; 370/342; 370/389

(58) Field of Classification Search ............... 370/312, 370/342, 389, 477; 709/231
See application file for complete search history.

(56) References Cited

U.S. PATENT DOCUMENTS
2003/0134651 A1*    7/2003    Hsu .................... 455/509

* cited by examiner

*Primary Examiner*—Joseph Feild
*Assistant Examiner*—Phuoc Doan
(74) *Attorney, Agent, or Firm*—Roylance, Abrams, Berdo & Goodman L.L.P.

(57) ABSTRACT

A system and method for synchronizing Broadcast/Multicast Service (BCMCS) traffic in a mobile communication system connected to a BCMCS server. A Packet Data Service Node (PDSN) receives a BCMCS content frame from the BCMCS server, and transmits a corresponding Generic Routing Encapsulation (GRE) packet BCMCS content frame, including a sequence number and a timestamp value indicating when the GRE packet BCMCS content frame is transmitted, to Packet Control Functions (PCF) connected downstream of the PDSN. Each of the PCFs determines whether the GRE packet BCMCS content frame received from the PDSN is valid, based on the sequence number included therein. If the GRE packet BCMCS content frame is valid, the PCF transmits the frame to its lower nodes connected downstream of the PCF, while synchronizing the frame transmission, based on the timestamp value included in the frame.

24 Claims, 9 Drawing Sheets

SYSTEM AND METHOD FOR SYNCHRONIZING BROADCAST/MULTICAST SERVICE CONTENT FRAMES IN A MOBILE COMMUNICATION SYSTEM

PRIORITY

This application claims the benefit under 35 U.S.C. 119(a) of an application entitled "METHOD FOR SYNCHRONIZING BROADCAST/MULTICAST SERVICE CONTENT FRAMES IN MOBILE COMMUNICATION SYSTEM", filed in the Korean Intellectual Property Office on Sep. 13, 2003 and assigned Serial No. 2003-63471, the entire contents of which are incorporated herein by reference.

BACKGROUND OF THE INVENTION

1. Field of the Invention

The present invention relates to a synchronization system and method used for a mobile communication system. More particularly, the present invention relates to a system and method for synchronizing broadcast/multicast service frames provided in a mobile communication system.

2. Description of the Related Art

Mobile communication systems were originally designed to provide a voice communication service allowing user mobility. Along with rapid development of the technology, the mobile communication system now provides various services in various fields to meet user demand. The latest mobile communication system can provide not only an SMS service but also email, Internet and broadcast services. To provide the various services, a synchronous Code Division Multiple Access (CDMA) system has evolved to an IS-95 system and then to a CDMA-2000 system, which has been commercialized in some areas. A high-speed data only system, called First Evolution-Data Only (1xEV-DO), was then introduced, and a system enabling high-speed data transmission and voice communication at the same time, which is called First Evolution-Data and Voice (1xEV-DV), was then introduced. Many parts of the 1xEV-DV system are under discussion in the standardization bodies.

Since the CDMA system basically uses a synchronous mode, it operates within a synchronized network. However, with network synchronization, it is difficult for the mobile communication system to provide broadcast services. This is due to the fact that it has been proposed that the mobile communication system provide broadcast services by interworking with a contents server connected to the system, instead of providing broadcast services using radio waves. Some example systems capable of providing broadcast services are CDMA 2000, CDMA 1xEV-DO, and CDMA 1xEV-DV systems. A conventional network structure and operation for providing broadcast services, for example, using the CDMA 1xEV-DO system will now be described with reference to FIG. 1.

FIG. 1 is an illustrative diagram of the configuration of a CDMA 1xEV-DO system implemented for providing broadcast services. The CDMA 1xEV-DO system includes an Access Terminal (also referred to as a "mobile terminal" or a "mobile station") (AT) 100, and first and second Access Networks (ANs) 110 and 120, Packet Control Functions (PCFs) 130a and 130b, a Packet Data Service Node (PDSN) 140, and an authentication system 150 which are implemented to provide high-speed data services to the access terminal 100. The CDMA 1xEV-DO system further includes a Broadcast/Multicast Service (BCMCS) controller 160 and a BCMCS content server 170 for providing broadcast services. The configuration of the 1x EV-DO mobile communication system for providing high-speed data services to the access terminal will now be described in detail with reference to FIG. 1.

The access network 110 has a specific wireless communication area, and includes Access Network Transceiver Systems (ANTS) 111a to 111n for providing data services to the access terminal 100 through radio channels established with the access terminal 100, and an Access Network Controller 112 for controlling the ANTSs 111a to 111n. The access network 120 has a specific wireless communication area, and includes Access Network Transceiver Systems (ANTS) 121a to 121n for providing data services to the access terminal 100 through radio channels established with the access terminal 100, and an Access Network Controller 122 for controlling the ANTSs 121a to 121n. The following description will be given based on the access networks 110 and 120 except when their ANTSs and ANCs must be distinguished from each other.

The PCFs 130a and 130b are connected respectively to the access networks 110 and 120 to control processing for providing broadcast services and high-speed data services to the access networks 110 and 120. The PCFs 130a and 130b are also connected to the PDSN 140, which is a termination node for connection to the Internet or other networks to provide data services in the mobile communication system. The PDSN 140 is connected to the authentication system 150 for authentication of terminals in the mobile communication system.

The authentication system 150 includes an Access Network Authentication, Accounting and Authorization (AN-AAA) system 151 for authentication of the 1x EV-DO system, and an AAA system 152 for authentication of other networks such as Internet and broadcast service networks.

The BCMCS content server 170 is a server for providing broadcast/multicast services to the PDSN 140. The BCMCS content server 170 produces broadcast data, including video and audio data for broadcasting, into Internet Protocol (IP) packets, and provides the broadcast data IP packets to the PDSN 140. The BCMCS controller 160 controls the BCMCS content server 170, and determines whether the broadcast service is to be provided to the terminal, according to the user authentication result.

The CDMA 1xEV-DO system can provide the broadcast service based on the above configuration as shown in FIG. 1. Higher nodes of the access networks 110 and 120 provide the broadcast service to the access networks 110 and 120 in an IP multicast scheme. However, the access terminal 100 may be in motion while receiving the broadcast service. The packet data service is also liable to cause a time delay. To provide the broadcast service to the access terminal 100 properly regardless of whether the access terminal 100 is in motion, BCMCS traffic must be transmitted from the access networks simultaneously to the access terminal 100. However, packets for providing the broadcast service may be transmitted to the access networks with different time delays. The time delays depend on characteristics of the packets and the amount of BCMCS traffic.

Since the BCMCS traffic is transmitted using the packets, the access networks may provide packets or frames of the same broadcast service at different times. This problem is critical when performing handoff of the broadcast service. It is also practically impossible for the access terminals to combine and use traffic frames received simultaneously from a number of access networks (also referred to as "base stations"). Further, the access terminal may recognize traffic of the same broadcast service, provided from another base station near the access terminal, as noise.

SUMMARY OF THE INVENTION

Therefore, the present invention has been made in view of the above problems, and it is an object of the present invention to provide a system and method for synchronizing Broadcast/Multicast Service (BCMCS) content frames of a broadcast/multicast service provided in a mobile communication system.

It is another object of the present invention to provide a system and method for enabling an access terminal (or mobile terminal) to receive BCMCS content frames of the same BCMCS service simultaneously from different base stations (or access networks) near the access terminal in a mobile communication system, and then to combine and use the simultaneously received frames.

It is yet another object of the present invention to provide a system and method for increasing the reception efficiency of traffic of a BCMCS service provided in a mobile communication system.

In accordance with the present invention, the above and other objects can be accomplished by the provision of a system and method for transmitting a Broadcast/Multicast Service (BCMCS) content frame in a mobile communication system connected to a BCMCS server. The system and method comprise receiving, by a Packet Data Service Node (PDSN), a BCMCS content frame from the BCMCS server, and transmitting a corresponding Generic Routing Encapsulation (GRE) packet BCMCS content frame, including a sequence number and a timestamp value indicating when the GRE packet BCMCS content frame is transmitted, from the PDSN to first lower nodes of the PDSN, the first lower nodes being connected downstream of the PDSN; and checking, by each of the first lower nodes, whether the GRE packet BCMCS content frame received from the PDSN is valid, based on the sequence number included in the received GRE packet BCMCS content frame, and, if the GRE packet BCMCS content frame is valid, transmitting the GRE packet BCMCS content frame from each of the first lower nodes to second lower nodes connected downstream of each of the first lower nodes, while synchronizing the transmission of the GRE packet BCMCS content frame, based on the timestamp value included in the GRE packet BCMCS content frame.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
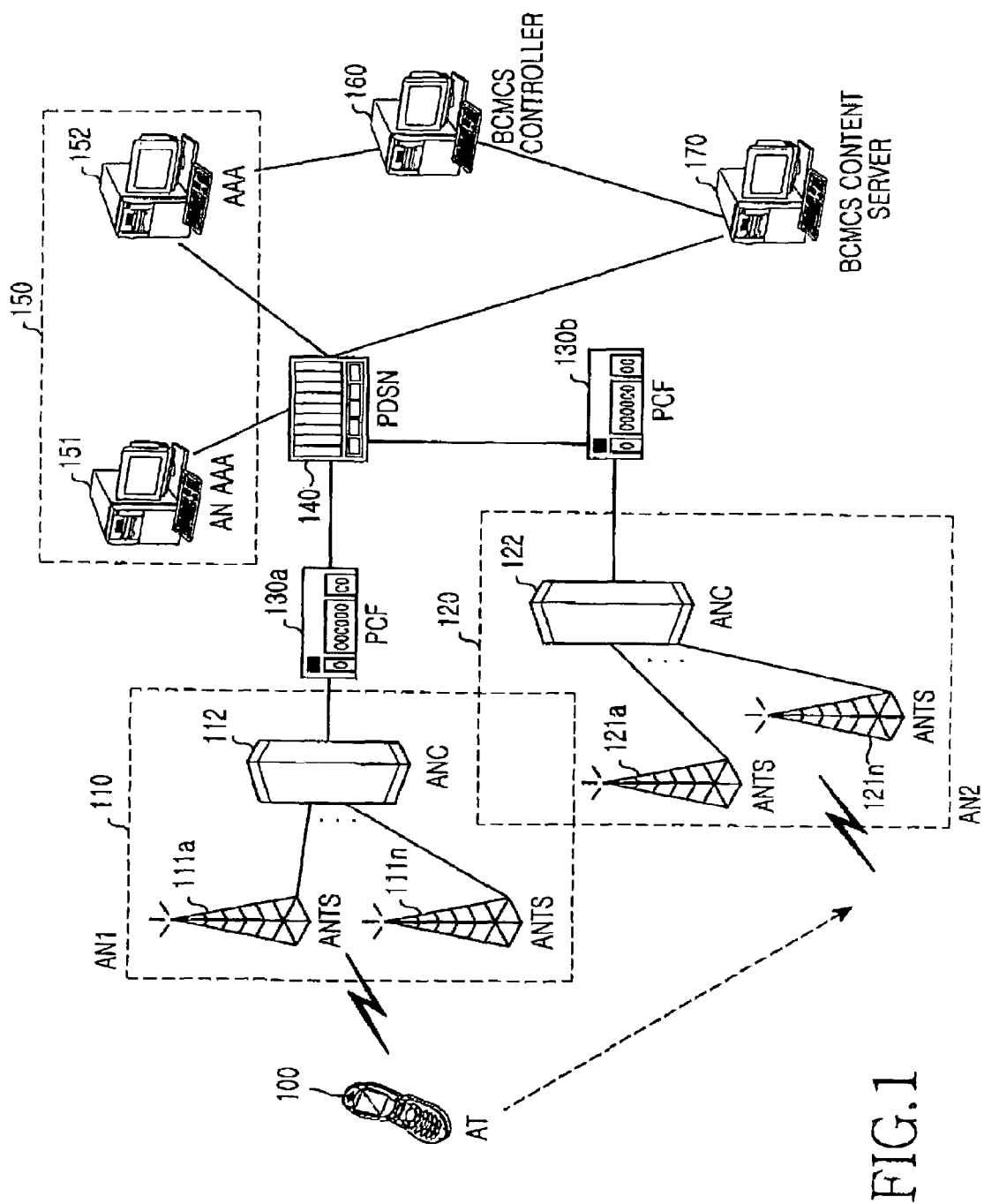
FIG. 1 is an illustrative diagram of the configuration of a Code Division Multiple Access (CDMA) First Evolution-Data Only (1xEV-DO) system implemented for providing Broadcast/Multicast Service (BCMCS) services.

Embodiments of the present invention will now be described in detail with reference to the accompanying drawings. In the drawings, the same or similar elements are denoted by the same reference numerals even though they are depicted in different drawings. In the following description, a detailed description of known functions and configurations incorporated herein will be omitted for conciseness.

A description will be given of solutions to a delay that may occur in forward transmission of Broadcastl/Multicast Service (BCMCS) content frames from a Packet Data Service Node (PDSN) to Packet Control Functions (PCFs) and from a PCF to Base Station Systems (BSSs) or Access Networks (ANs) in a mobile communication system providing a BCMCS service. The following description of methods for preventing the delay according to embodiments of the present invention will be divided into two sections, the first for the Code Division Multiple Access (CDMA) 2000 1x system, and the second for the CDMA First Evolution-Data Only (1x EV-DO) system. Specifically, the first description will be given of methods for synchronizing transmission of BCMCS content frames from a PDSN to PCFs, from a PCF to Base Station Controllers (BSCs), and from a BSC to Base Transceiver Stations (BTSs) when the embodiments of the present invention are applied to the CDMA 2000 1x system. The following is a brief description of a method for synchronizing between a PDSN and a PCF in the CDMA 2000 1x system according to the embodiments of the present invention, which will be described in detail later. When the PCF receives a first BCMCS content frame from the PDSN, the PCF reads transmission time information included in the first BCMCS content frame, which indicates the time when the BCMCS content frame is transmitted from the PDSN, and sets a start time for measuring transmission delay on the basis of the read transmission time. Then, when the PCF receives a second BCMCS content frame from the PDSN, the PCF reads transmission time information of the second BCMCS content frame. Based on the two consecutive transmission times, the PCF calculates a transmission period, at intervals of which BCMCS content frames are transmitted from the PDSN. When it is time to receive a third BCMCS content frame, the PCF transmits the first BCMCS content frame, which has been stored in the PCF, to BSCs connected downstream of the PCF. The system and method according to the embodiments of the present invention may be embodied such that the BSC performs the same operation as performed by the PCF for synchronization between the PCF and the BSC. The system may also be embodied such that both the PCF and the BSC (or one of the two) perform the operation for synchronization between the PCF and the BSC. These aspects of the system and method according to the embodiments of the present invention for the CDMA 2000 1x system may also be applied to the CDMA 2000 1x EV-DO system. That is, in the following description, it is assumed that the method according to the embodiments of the present invention are performed in the same manner for both the CDMA 2000 1x system and the CDMA 2000 1x EV-DO system, unless a description is given of a different aspect of the method used for the CDMA 2000 1x EV-DO system from the method used for the CDMA 2000 1x system or of a special aspect unique to the CDMA 2000 1x system.

Figure 2:
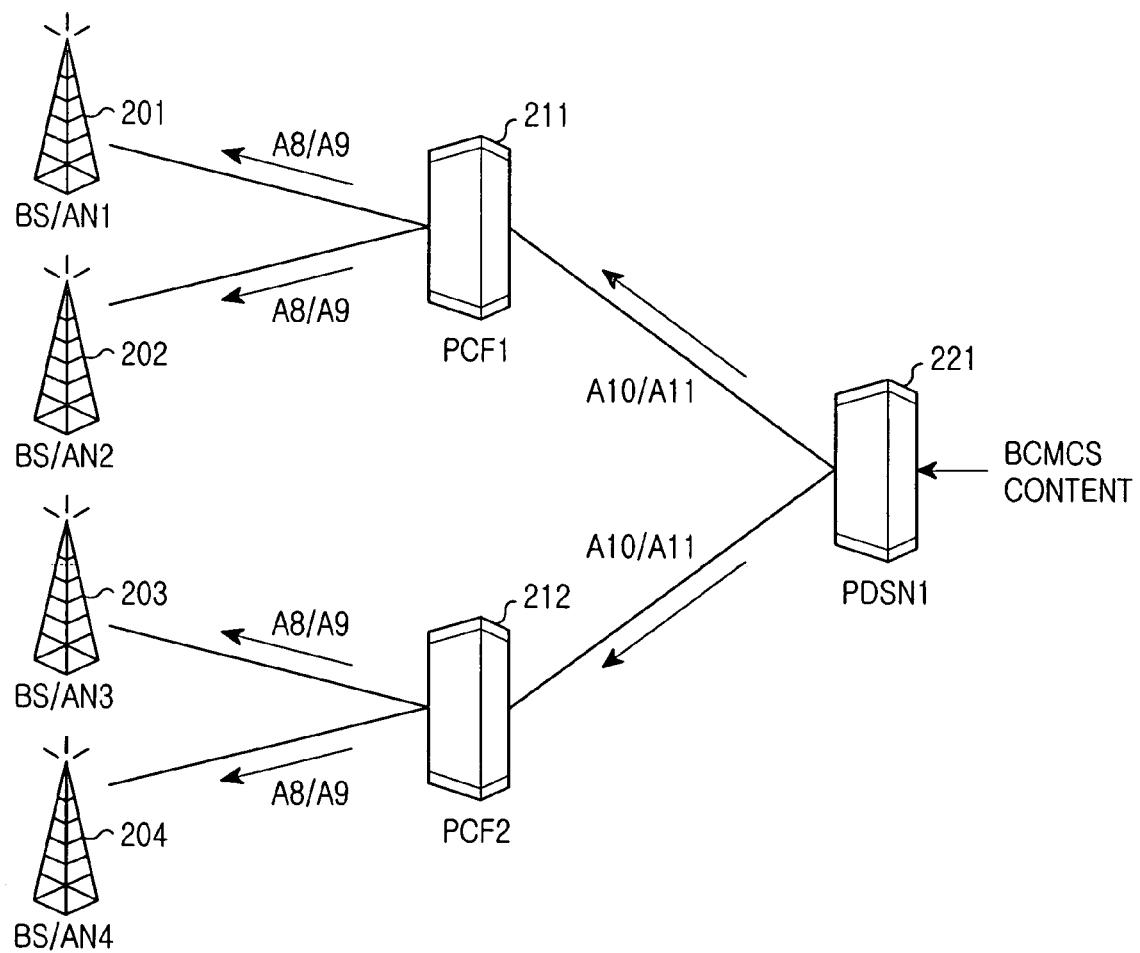
FIG. 2 is a signal flow diagram illustrating how BCMCS content is provided in a mobile communication system according to an embodiment of the present invention.

FIG. 2 is a signal flow diagram illustrating how BCMCS content is provided in a mobile communication system according to an embodiment of the present invention. A method for providing BCMCS content in a mobile communication system according to the present invention will now be described in detail with reference to FIG. 2.

In FIG. 2, base stations or access networks 201, 202, 203 and 204 are denoted by "BS" or "AN" (i.e., "BS/AN"). This indicates that the present invention is applied to both the CDMA 1x EV-DO system and the CDMA 2000 1x system in the same manner. A first PCF 211, connected to the first and second base stations 201 and 202, provides a BCMCS content frame to the first and second base stations 201 and 202 through A8/A9 interfaces. A second PCF 212, connected to the third and fourth base stations 203 and 204, provides a BCMCS content frame to the base stations 203 and 204 through A8/A9 interfaces. The first and second PCFs 211 and 212 are connected with a PDSN 221, which provides a BCMCS content frame to the PCFs 211 and 212 through A10/A11 interfaces. In the mobile communication system configured in this manner, a BCMCS content frame is transmitted from a network device simultaneously to its lower nodes connected downstream of the network device. Specifically, the PDSN 221 transmits the BCMCS content frame simultaneously to the PCFs 211 and 212 connected downstream of the PDSN 221. The PCFs 211 and 212 transmit the BCMCS content frame simultaneously to the base stations 201, 202, 203 and 204 connected downstream of the PCFs 211 and 212. The base stations 201 to 204 transmit the BCMCS content frame simultaneously to the access terminal. The simultaneous transmission to the lower nodes will be described later in more detail. Definitions of the terms used in the embodiments of the present invention will be presented in the following description.

Figure 3A:
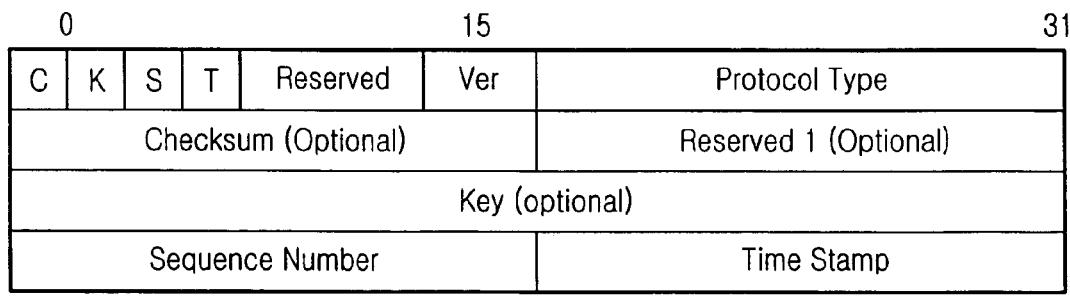
FIG. 3A illustrates fields of a Generic Routing Encapsulation (GRE) header changed according to a first embodiment of the present invention.

To enable the PDSN 221 and the PCFs 211 and 212 to transmit the BCMCS content frame simultaneously to their lower nodes, it is necessary to change a Generic Routing Encapsulation (GRE) header defined in the A8/A10 interface. FIG. 3A illustrates fields of a GRE header changed according to a first embodiment of the present invention.

The description of FIG. 3A will be given only for changes in a GRE header prescribed in the current specifications. The present invention proposes two main changes in the GRE header.

The first change is a 1-bit T field added to the GRE header. If the T field is set to "1", it indicates that a 32-bit sequence number in the GRE header is used for time synchronization or that a new 32-bit field for time synchronization, in addition to an existing field corresponding to the sequence number, is added to the GRE header. The T field is used to synchronize BCMCS traffic.

The second change is a timestamp field added to the GRE header and a changed sequence number field therein. According to an embodiment of the present invention, the conventional 32-bit sequence number in the A8/A10 GRE header for use in unicast transmission is divided into a 16-bit sequence number and a 16-bit timestamp, which are used to compensate for packet loss and transmission delay occurring when BCMCS content frames are transmitted from the PDSN to the PCFs and from the PCFs to the base stations. That is, the currently used 32 bits of a GRE packet are divided into two sections for different uses such that the first 16 bits are used to indicate a sequence number of the GRE packet and the second 16 bits are used to indicate the transmission time of the GRE packet (i.e., indicate when the GRE packet is transmitted).

Figure 3B:
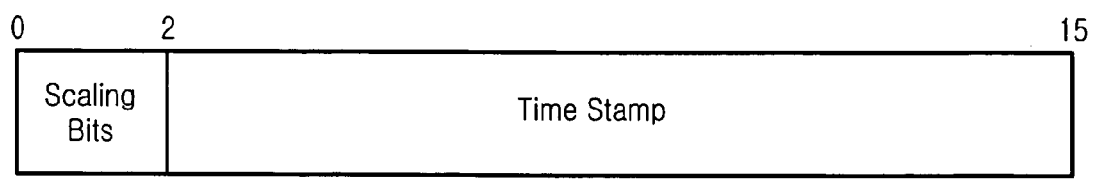
FIG. 3B illustrates the least significant 16 bits of an A8/A10 GRE header implemented according to the first embodiment of the present invention.

FIG. 3B illustrates the most significant 16 bits of an A8/A10 GRE header implemented according to the first embodiment of the present invention. In FIG. 3B, the first 2 bits are scaling bits for determining the time unit of the timestamp, and the remaining 14 bits indicate a time value of the timestamp. The remaining 14 bits can express the time with a maximum accuracy of 0.000061035 seconds (i.e., 61.035 micro seconds). The purpose of incorporating the scaling bits into the timestamp of the GRE header is to determine the time unit of the timestamp since the time unit of delay measurement between the PDSN and the PCFs may differ from that between the PCFs and the base stations (specifically, BSCs in the base stations or ANCs in the access networks). The service provider may determine the time unit of the timestamp.

Figure 4A:
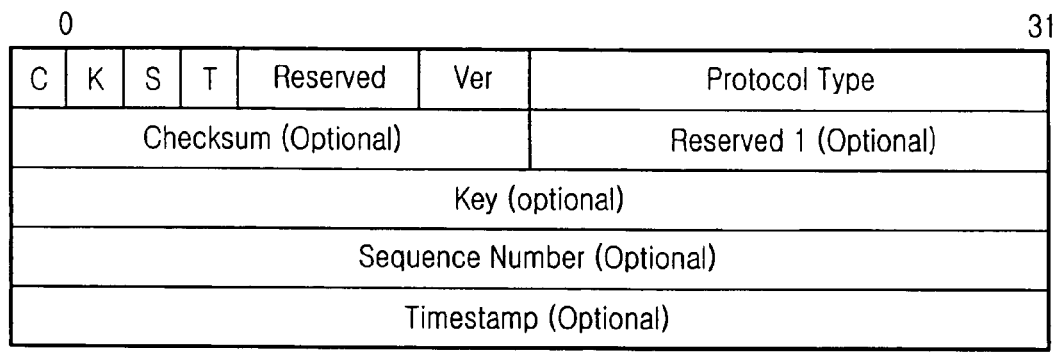
FIG. 4A illustrates fields of a GRE header changed according to a second embodiment of the present invention.

FIG. 4A illustrates fields of a GRE header changed according to a second embodiment of the present invention. According to the second embodiment, as shown in FIG. 4A, a 1-bit "T" flag field is added to the conventional A8/A10 GRE header for use in unicast transmission, prescribed in the current specifications, to indicate whether a timestamp is present in the GRE header. In addition, a 32-bit timestamp is optionally added to the GRE header to compensate for transmission delay occurring when BCMCS content frames are transmitted from the PDSN to the PCFs and from the PCFs to the base stations (specifically, BSCs in the base stations or ANCs in the access networks).

Figure 4B:
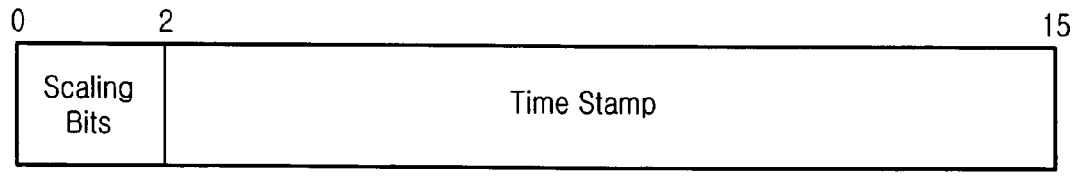
FIG. 4B illustrates a timestamp header optionally added to the GRE header according to the second embodiment of the present invention.

FIG. 4B illustrates a timestamp header optionally added to the GRE header according to the second embodiment of the present invention. The first 2 bits are scaling bits for determining the time unit of the timestamp, and the remaining 30 bits are used to accurately indicate a time value of the timestamp.

Figure 4C:
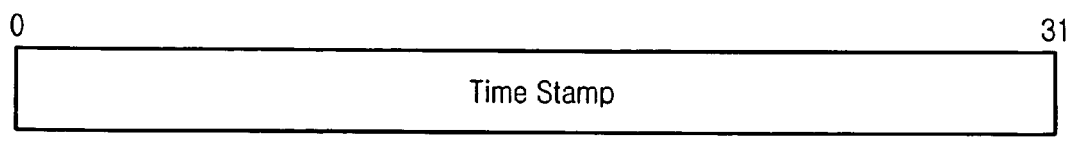
FIG. 4C illustrates another timestamp header optionally added to the GRE header according to the second embodiment of the present invention.

FIG. 4C illustrates another timestamp header optionally added to the GRE header according to the second embodiment of the present invention. In FIG. 4C, the timestamp header uses the low order 32 bits of the Network Time Protocol (NTP) timestamp, without using the scaling bits as in FIG. 4B. In the following description, a BCMCS content frame including BCMCS content data, with a GRE header added thereto, is referred to as a "GRE packet BCMCS content frame".

Figure 5:
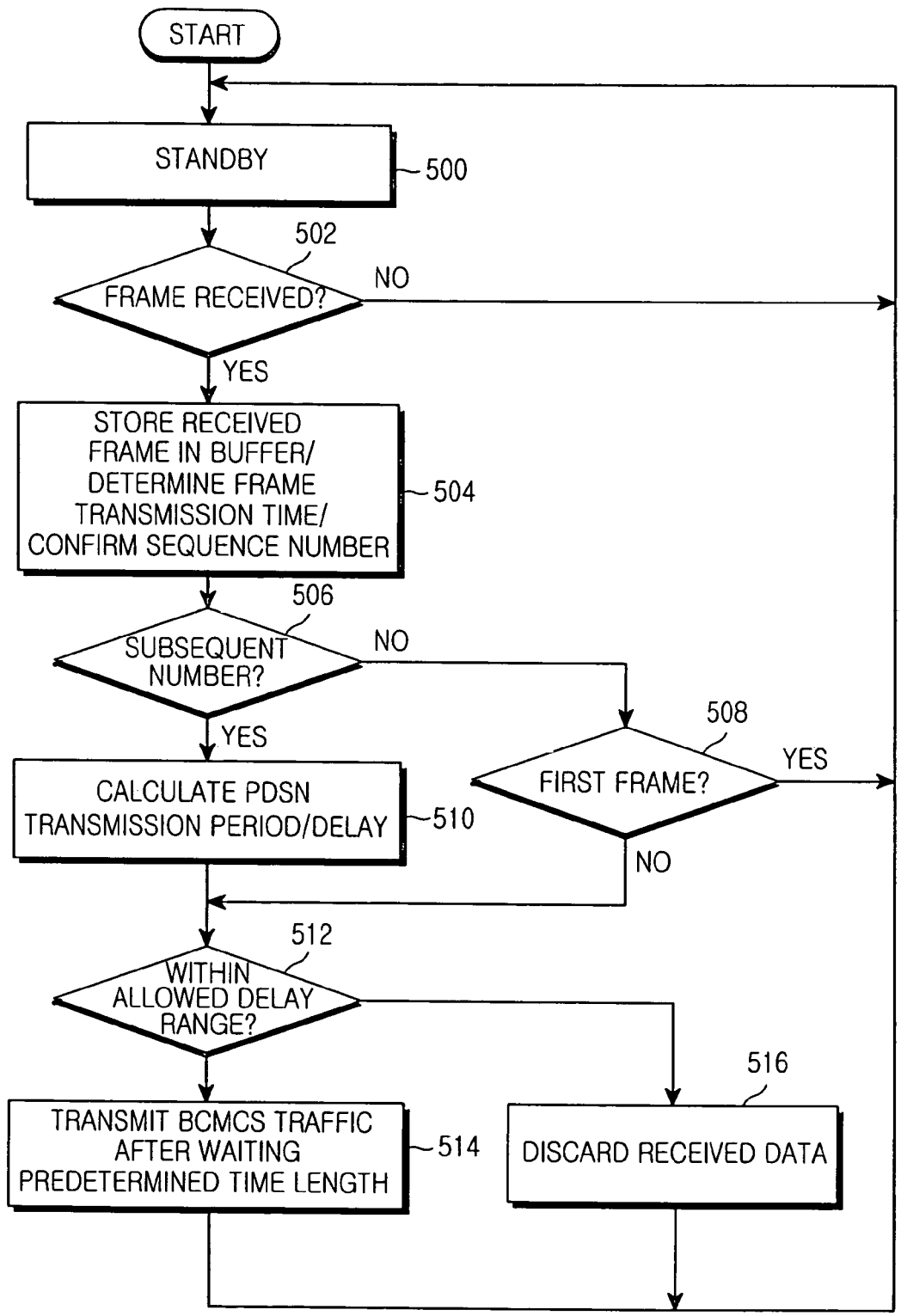
FIG. 5 is a control flow chart illustrating how a Packet Control Function (PCF) synchronously transmits GRE packet BCMCS content frames to its lower nodes when receiving the frames from a PDSN according to the present invention.

FIG. 5 is a control flow chart illustrating how a PCF synchronously transmits GRE packet BCMCS content frames to BSCs or ANCs when receiving the frames from a PDSN according to an embodiment of the present invention. Although the description of FIG. 5 is given only for the operation for transmitting GRE packet BCMCS content frames from the PCF to the base station controllers, the method of FIG. 5 can be performed in the same manner also when a BSC or ANC transmits GRE packet BCMCS content frames, received from the PCF, to BTSs or ANTSs.

First, the PCF is in a standby mode at step 500. The standby mode refers to a state in which the PCF waits for the reception of a GRE packet BCMCS content frame. Then, at step 502, the PCF determines whether a GRE packet BCMCS content frame is received. If a GRE packet BCMCS content frame is received, the PCF proceeds to step 504. At step 504, the PCF stores the received GRE packet BCMCS content frame in a buffer. At step 504, the PCF also checks when the received GRE packet BCMCS content frame is transmitted from the PDSN, with reference to a GRE header included in the received frame as shown in FIGS. 3A and 3B or FIGS. 4A to 4C, and then determines when to transmit the received frame to its lower nodes. The PCF also confirms a sequence number of the received GRE packet BCMCS content frame, with reference to the GRE header. The PCF then proceeds to step 506 to determine whether the sequence number of the received GRE packet BCMCS content frame is subsequent to that of the previously received frame.

If the received GRE packet BCMCS content frame has the subsequent sequence number, the PCF proceeds to step 510, otherwise it proceeds to step 508. At step 508, the PCF determines whether the currently received frame is the first frame of a corresponding GRE packet BCMCS content traffic. If the currently received frame is the first frame, the PCF returns to step 500, otherwise it proceeds to step 512. If the PCF receives a frame previous to a frame which the PCF has transmitted, instead of receiving a frame subsequent to the previously received frame, the received frame is generally discarded.

This is because there is no need to retransmit the received frame when it is the previous frame. In addition, if the received frame is not the subsequent frame, i.e., if it has no subsequent sequence number, a frame is highly likely to be lost in the transmission line. It is requested that the lost frame be retransmitted, or it is discarded without the retransmission.

At step 510, the PCF calculates a transmission period, at intervals of which frames are transmitted from the PDSN, and calculates a delay of the frame transmission from the PDSN. The PCF then proceeds to step 512 to determine whether the received GRE packet BCMCS content frame is valid. If the received GRE packet BCMCS content frame is valid (i.e., if its transmission delay is within an allowed delay range), the PCF proceeds to step 514 to transmit the broadcast traffic (i.e., the GRE packet BCMCS content frame) according to a predetermined time length (more specifically, after waiting the predetermined time length). If the received GRE packet BCMCS content frame is invalid (i.e., if its transmission delay is not within the allowed delay range), the PCF proceeds to step 516 to discard the received data (i.e., the received GRE packet BCMCS content frame).

Figure 6:
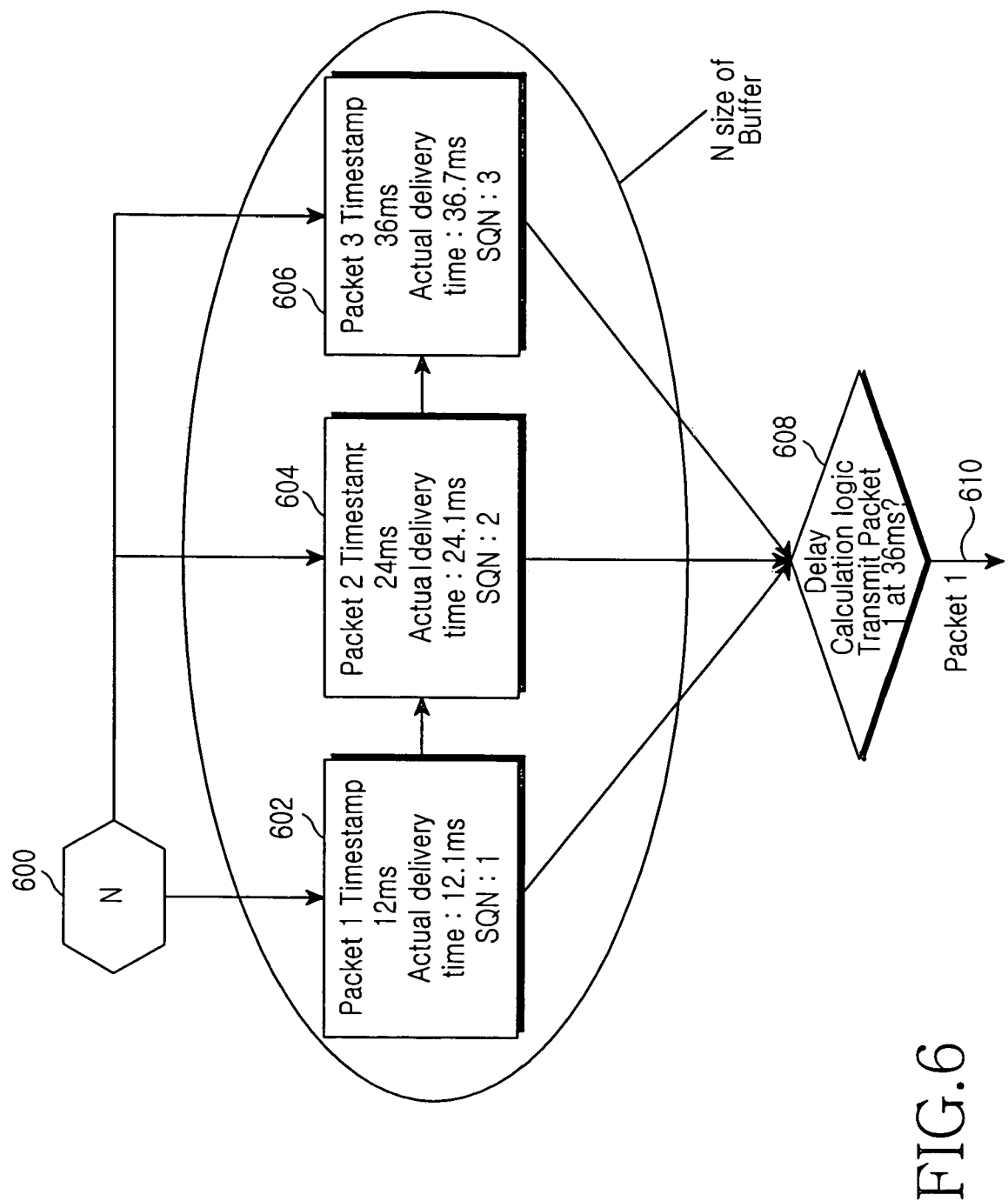
FIG. 6 is a flow chart illustrating a synchronization method in a mobile communication system according to an embodiment of the present invention.

The synchronization procedure in the method of FIG. 5 will now be described with reference to FIG. 6. FIG. 6 is a flow chart illustrating an exemplary synchronization method in a mobile communication system according to an embodiment of the present invention. The following description of FIG. 6 will be given for the case where the PCF receives first to third GRE packet BCMCS content frames of a broadcast/multicast service.

After GRE packet setting is performed for BCMCS content frame transmission, the PCF receives the first GRE packet BCMCS content frame from the PDSN at step 600. The PCF stores the received GRE packet BCMCS content frame in a buffer of size N at step 600. At step 602, the PCF reads timestamp information ("12 ms" in the example of FIG. 6) in a GRE header of the received GRE packet BCMCS content frame, so as to confirm when the received GRE packet BCMCS content frame is transmitted from the PDSN. At step 602, the PCF also determines a sequence number (SQN="1" in the example of FIG. 6) of the received GRE packet BCMCS content frame. Then, at step 608, the PCF measures delay ("12.1 ms−12 ms=0.1 ms" in the example of FIG. 6) of transmission of the GRE packet BCMCS content frame from the PDSN to the PCF. Then, the PCF waits for a second GRE packet BCMCS content frame corresponding to a sequence number "2" increased by one from the sequence number "1" of the frame received at step 602.

At step 604, after receiving the second GRE packet BCMCS content frame (SQN=2), the PCF reads timestamp information "24 ms" in a GRE header of the second GRE packet BCMCS content frame, and calculates a transmission period T ("24 ms−12 ms=12 ms" in the example of FIG. 6), at intervals of which GRE packet BCMCS content frames are transmitted from the PDSN. Then, the PCF waits for a third GRE packet BCMCS content frame corresponding to a sequence number "3" increased by one from the sequence number "2" of the frame received at step 604.

Then, at step 608, the PCF measures delay ("24.1 ms−24 ms=0.1 ms" in the example of FIG. 6) of transmission of the second GRE packet BCMCS content frame from the PDSN to the PCF. If the calculated transmission delay is equal to that of the previous frame (i.e., the first frame), it is determined that there is no problem on the transmission line. Even when the calculated transmission delay differs from that of the previous frame (i.e., the first frame), it is determined that there is no problem on the transmission line if the calculated transmission delay is smaller than twice the transmission period.

Then, at step 610, the PCF transmits the first GRE packet BCMCS content frame, received from the PDSN, simultaneously to all the BSCs connected to the PCF at a time of "36 ms" (=24 ms+12 ms) corresponding to the sum of the time "24 ms" when the second GRE packet BCMCS content frame is transmitted from the PDSN and the transmission period "12 ms", measured using the two GRE packet BCMCS content frames received at steps 602 and 604. The PCF then prepares to transmit the second GRE packet BCMCS content frame, received from the PDSN, simultaneously to all the BSCs connected to the PCF at a time of "48 ms" (=24 ms+2×12 ms) corresponding to the sum of the second frame transmission time "24 ms" and twice the transmission period "24 ms" (=2×12 ms).

On the other hand, after receiving the third GRE packet BCMCS content frame from the PDSN at step 606, the PCF measures, at step 608, delay ("36.7 ms−36 ms=0.7 ms" in the example of FIG. 6) of transmission of the third GRE packet BCMCS content frame from the PDSN to the PCF. Even when the calculated transmission delay differs from that of the previous frame, it is determined that there is no problem on the transmission line if the calculated transmission delay is smaller than twice the transmission period. However, if the calculated transmission delay is larger than twice the transmission period, it is determined that there is a problem on the transmission line, and the frame (i.e., the third frame) received too late is discarded.

Figure 7:
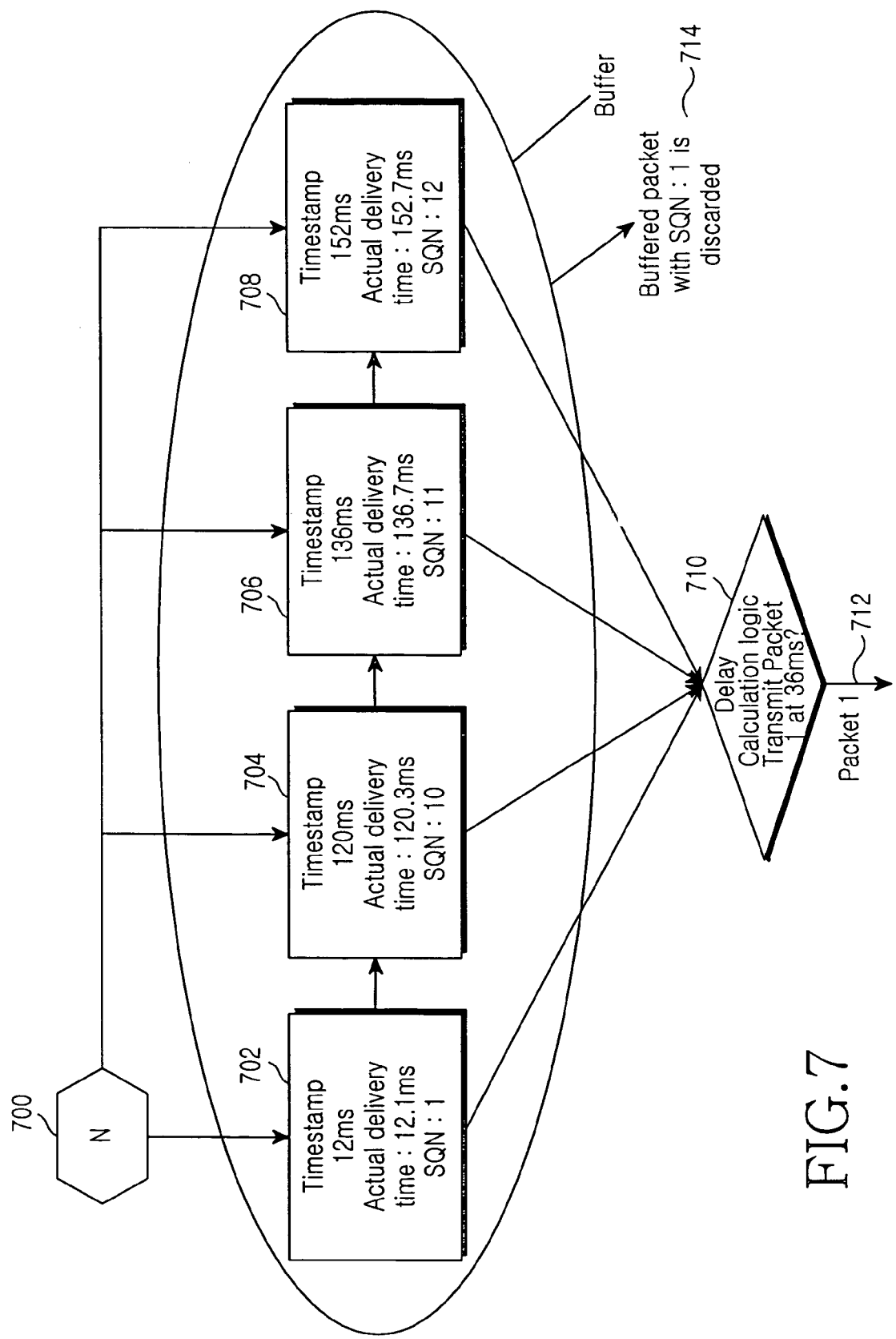
FIG. 7 is a flow chart illustrating how the PCF handles GRE packet BCMCS content frames sequentially received from the PDSN after receiving a first GRE packet BCMCS content frame therefrom.

FIG. 7 is a flow chart illustrating how the PCF operates when a frame loss occurs when receiving GRE packet BCMCS content frames sequentially after receiving the first GRE packet BCMCS content frame.

When the PCF receives a GRE packet BCMCS content frame at step 700, the PCF proceeds to step 702. At step 702, the PCF stores the received GRE packet BCMCS content frame in a buffer of size N. At step 702, the PCF reads timestamp information "12 ms" in a GRE header included in the received GRE packet BCMCS content frame, so as to confirm when the received GRE packet BCMCS content frame is transmitted from the PDSN. At step 702, the PCF also determines a sequence number "SQN=1" of the received GRE packet BCMCS content frame. Then, at step 710, the PCF measures delay "12.1 ms−12 ms=0.1 ms" of transmission of the GRE packet BCMCS content frame from the PDSN to the PCF. Then, the PCF waits for a second GRE packet BCMCS content frame corresponding to a sequence number "2" increased by one from the sequence number "1" of the frame received at step 702.

Then, at step 704, the PCF receives a second GRE packet BCMCS content frame having a sequence number "10". Since the sequence number of the second GRE packet BCMCS content frame is "10", the second frame is not a frame transmitted subsequent to the previously received frame (i.e., the first frame) having the sequence number "1", so that it is determined that some intermediate frames are lost. Accordingly, the first GRE packet BCMCS content frame is discarded at step 714.

The PCF returns to step 700 to receive a GRE packet BCMCS content frame, and then proceeds to step 704 to again perform time synchronization based on the currently received GRE packet BCMCS content frame (i.e., the second received frame) since the first received BCMCS content frame is discarded. The PCF regards the currently received GRE packet BCMCS content frame as a first GRE packet BCMCS content frame required for time synchronization, and stores it in the buffer of size N. At step 704, the PCF reads timestamp information "120 ms" in a GRE header of the received GRE packet BCMCS content frame, so as to confirm when the received GRE packet BCMCS content frame is transmitted from the PDSN. At step 704, the PCF also determines a sequence number "SQN=10" of the received GRE packet BCMCS content frame. Then, at step 710, the PCF measures delay "120.3 ms−120 ms=0.3 ms" of transmission of the GRE packet BCMCS content frame from the PDSN to the PCF. Then, the PCF waits for a second GRE packet BCMCS content frame corresponding to a sequence number "11" increased by one from the sequence number "10" of the first frame received at step 704.

At step 706, after receiving the second GRE packet BCMCS content frame (SQN=11), the PCF reads timestamp information "136 ms" in a GRE header of the second GRE packet BCMCS content frame, and calculates a transmission period T "136 ms−120 ms=16 ms", at intervals of which GRE packet BCMCS content frames are transmitted from the PDSN. Then, the PCF waits for a third GRE packet BCMCS content frame corresponding to a sequence number "12" increased by one from the sequence number "11" of the second frame received at step 706.

Then, at step 710, the PCF measures delay "136.7 ms−136 ms=0.7 ms" of transmission of the second GRE packet BCMCS content frame from the PDSN to the PCF. If the calculated transmission delay is equal to that of the previous frame (i.e., the first frame), it is determined that there is no problem on the transmission line. Even when the calculated transmission delay differs from that of the previous frame (i.e., the first frame), it is determined that there is no problem on the transmission line if the calculated transmission delay is smaller than twice the transmission period.

Then, at step 712, the PCF transmits the first GRE packet BCMCS content frame received at step 704 simultaneously to all the BSCs connected to the PCF at a time of "152 ms" (=136 ms+16 ms) corresponding to the sum of the time "136 ms" when the second GRE packet BCMCS content frame is transmitted from the PDSN and the transmission period "16 ms", measured using the two GRE packet BCMCS content frames received at steps 704 and 706. The PCF then prepares to transmit the second GRE packet BCMCS content frame received at step 706 simultaneously to all the BSCs connected to the PCF at a time of "168 ms" (=136 ms+2×16 ms) corresponding to the sum of the second frame transmission time "136 ms" and twice the transmission period "32 ms" (=2×16 ms).

On the other hand, after receiving a third GRE packet BCMCS content frame from the PDSN at step 708, the PCF measures, at step 710, delay "152.7 ms−152 ms=0.7 ms" of transmission of the third GRE packet BCMCS content frame from the PDSN to the PCF. Even when the calculated transmission delay differs from that of the previous frame, it is determined that there is no problem on the transmission line if the calculated transmission delay is smaller than twice the transmission period. However, if the calculated transmission delay is larger than twice the transmission period, it is determined that there is a problem on the transmission line, and the frame (i.e., the third frame) received too late is discarded.

A description of synchronization between the PCF and the BSCs is omitted herein because the same method as described above and the corresponding algorithm can be applied to the synchronization between the PCF and the BSCs.

Figure 8:
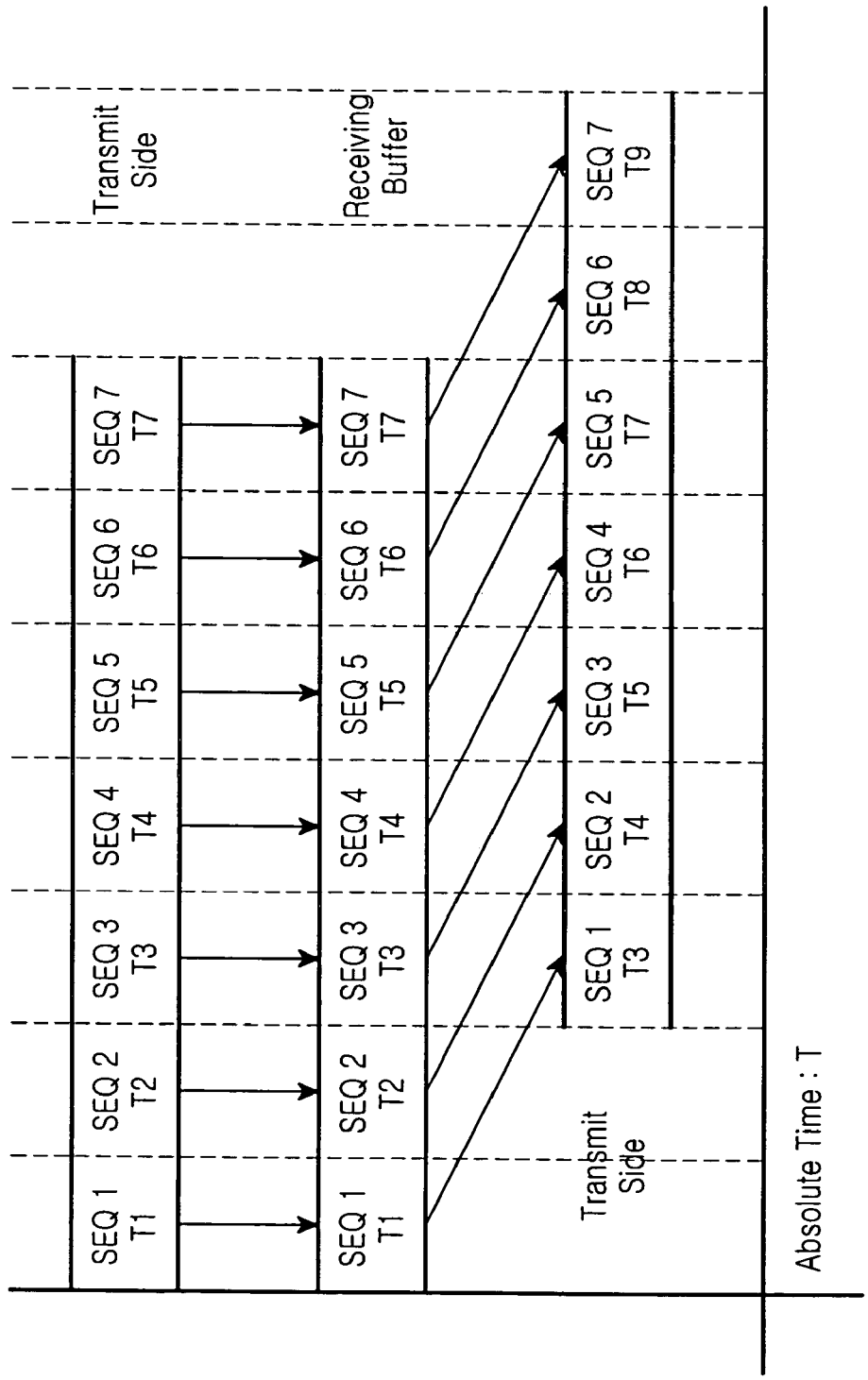
FIGS. 8 and 9 illustrate an example of a method for synchronously transmitting GRE packet BCMCS content frames received from a higher node according to the present invention.

FIG. 8 is a diagram illustrating how a receiving side (for example, a PCF) sequentially stores frames (also referred to as "packets") received from a transmitting side (for example, a PDSN) in a synchronization buffer of the receiving side. First, the receiving side stores a first frame "SEQ 1" received from the transmitting side in the buffer at an absolute time T1. After calculating a transmission period, at intervals of which frames are transmitted from the transmitting side, the receiving side transmits the first frame "SEQ 1" stored in the buffer to it lower nodes (for example, BSCs) at a time when the receiving side receives a third frame "SEQ 3".

Figure 9:
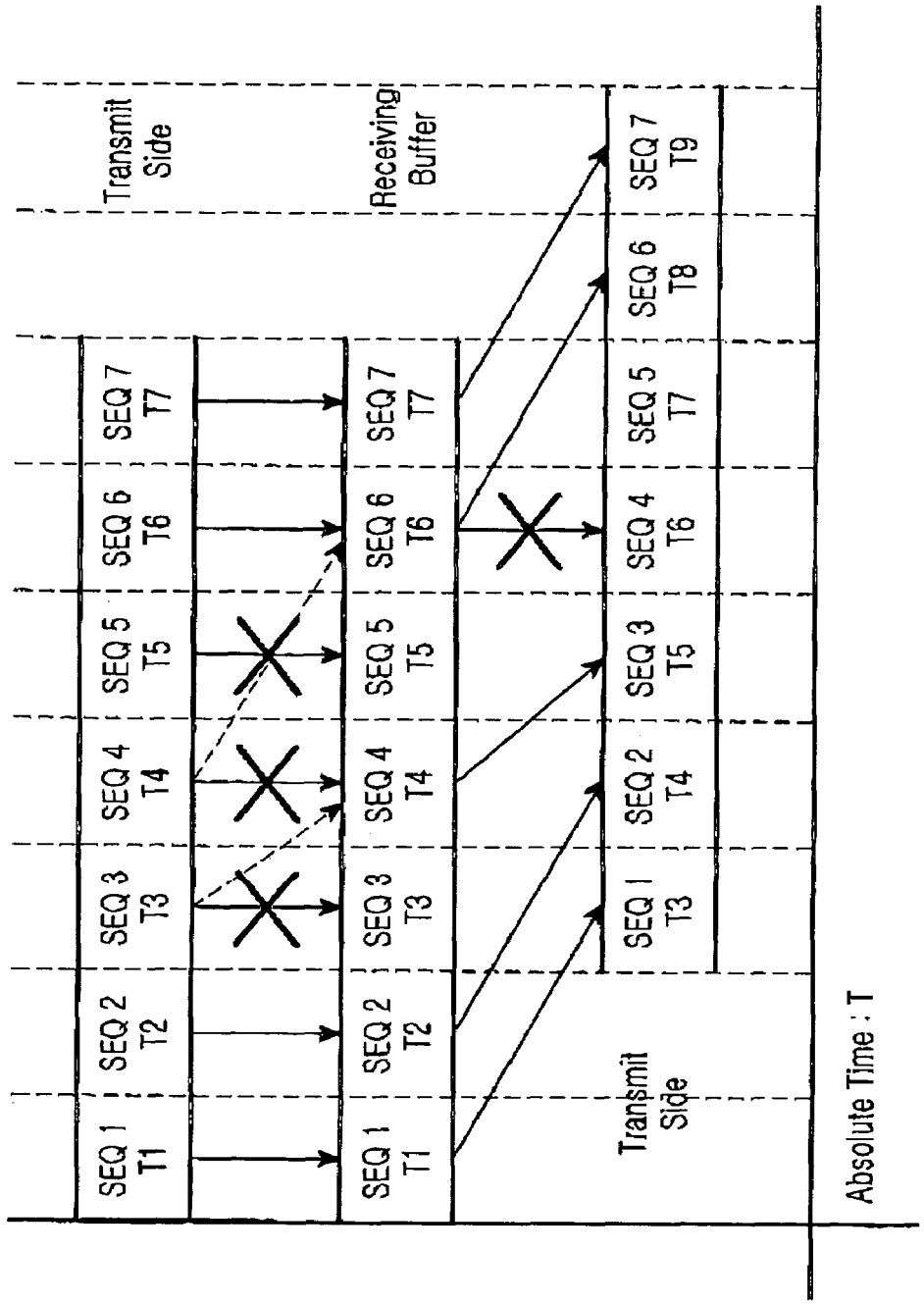

FIG. 9 is a diagram illustrating how the receiving side stores frames received from the transmitting side in the buffer and transmits the stored frames in the case where some frames transmitted from the transmitting side are lost or received by the receiving side much later than a scheduled time. As shown in FIG. 9, the receiving side receives a third frame "SEQ 3" with a delay longer than the delays of the first and second frames "SEQ 1" and "SEQ 2". However, the receiving side receives the third frame "SEQ 3" at a time when a fourth frame "SEQ 4" is transmitted from the transmitting side. That is, the receiving side receives the third frame "SEQ 3" with a delay smaller than twice the transmission period, so that the receiving side stores the third frame "SEQ 3" in the buffer and then transmits the third frame to its lower nodes (for example, BSCs) at a time when the fifth frame "SEQ 5" is transmitted from the transmitting side. However, the receiving side receives the fourth frame "SEQ 4" with a delay larger than twice the transmission period, so that the receiving side cannot transmit the fourth frame to its lower nodes (for example, BSCs) at a time when a sixth frame "SEQ 6" is transmitted from the transmitting side. Thus, the fourth frame "SEQ 4" is discarded, i.e., it is removed from the buffer. Since the receiving side does not receive the fifth frame "SEQ 5", the receiving side does not transmit the fifth frame to its lower nodes (for example, BSCs).

As apparent from the above description, the embodiments of the present invention provide a synchronization method in a mobile communication system, which make it possible to efficiently synchronize BCMCS content frames provided in the mobile communication system.

Although certain embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting a Broadcast/Multicast Service (BCMCS) content frame in a mobile communication system connected to a BCMCS server, the method comprising:

receiving, by a Packet Data Service Node (PDSN), a BCMCS content frame from the BCMCS server, and transmitting a corresponding Generic Routing Encapsulation (GRE) packet BCMCS content frame, including a sequence number and a timestamp value; and determining, by each of first lower nodes, whether the GRE packet BCMCS content frame received from the PDSN is valid, based on the sequence number included in the received GRE packet BCMCS content frame and, if the GRE packet BCMCS content frame is valid, transmitting the GRE packet BCMCS content frame from each of the first lower nodes to second lower nodes connected downstream of each of the first lower nodes, while synchronizing the transmission of the GRE packet BCMCS content frame, based on the timestamp value included in the GRE packet BCMCS content frame.

2. The method according to claim 1, wherein the timestamp value indicates when the GRE packet BCMCS content frame is transmitted, from the PDSN to first lower nodes of the PDSN, the first lower nodes being connected down stream of the PDSN.

3. The method according to claim 1, wherein the sequence number and the timestamp value are included in a GRE header of the GRE packet BCMCS content frame.

4. The method according to claim 1, wherein determining whether the GRE packet BCMCS content frame received from the PDSN is valid includes determining that the received GRE packet BCMCS content frame is valid if a transmission delay of the received GRE packet BCMCS content frame, calculated based on the timestamp value thereof, is smaller than a predetermined time length.

5. The method according to claim 1, wherein the transmission of the GRE packet BCMCS content frame is synchronized by transmitting the GRE packet BCMCS content frame after waiting a predetermined time length.

6. The method according to claim 4, wherein the predetermined time length is twice a period, at intervals of which the GRE packet BCMCS content frame is transmitted from the PDSN to the first lower nodes.

7. The method according to claim 5, wherein the predetermined time length is twice a period, at intervals of which the GRE packet BCMCS content frame is transmitted from the PDSN to the first lower nodes.

8. The method according to claim 1, further comprising:

receiving, by the second lower nodes, the GRE packet BCMCS content frame from each of the first lower nodes, and transmitting a GRE packet BCMCS content frame, including a sequence number and a timestamp value; and determining, by each of third lower nodes, whether the GRE packet BCMCS content frame received from each of the second lower nodes is valid, based on the sequence number included in the received GRE packet BCMCS content frame, and, if the GRE packet BCMCS content frame is valid, transmitting the GRE packet BCMCS content frame from each of the third lower nodes to fourth lower nodes connected downstream of each of the third lower nodes, while synchronizing the transmission of the GRE packet BCMCS content frame, based on the timestamp value included in the GRE packet BCMCS content frame.

9. The method according to claim 8, wherein and the timestamp value indicates when the GRE packet BCMCS content frame is transmitted, from each of the second lower nodes to the third lower nodes connected downstream of each of the second lower nodes.

10. The method according to claim 8, wherein determining whether the GRE packet BCMCS content frame received from each of the second lower nodes is valid includes determining that the received GRE packet BCMCS content frame is valid if transmission delay of the received GRE packet BCMCS content frame, calculated based on the timestamp value thereof, is smaller than a predetermined time length.

11. The method according to claim 8, wherein the transmission of the GRE packet BCMCS content frame is synchronized by transmitting the GRE packet BCMCS content frame after waiting a predetermined time length.

12. The method according to claim 10, wherein the predetermined time length is twice a period, at intervals of which the GRE packet BCMCS content frame is transmitted from each of the second nodes to the third lower nodes.

13. The method according to claim 11, wherein the predetermined time length is twice a period, at intervals of which the GRE packet BCMCS content frame is transmitted from each of the second nodes to the third lower nodes.

14. A method for transmitting a Broadcast/Multicast Service (BCMCS) content frame in a mobile communication system connected to a BCMCS server, the method comprising:

receiving, by a Packet Control Function (PCF), a BCMCS content frame from a Packet Data Service Node (PDSN), and transmitting a corresponding GRE packet BCMCS content frame, including a sequence number and a timestamp value; and determining, by each of first lower nodes, whether the GRE packet BCMCS content frame received from the PCF is valid, based on the sequence number included in the received GRE packet BCMCS content frame, and, if the GRE packet BCMCS content frame is valid, transmitting the GRE packet BCMCS content frame from each of the first lower nodes to second lower nodes connected downstream of each of the first lower nodes, while synchronizing the transmission of the GRE packet BCMCS content frame, based on the timestamp value included in the GRE packet BCMCS content frame.

15. The method according to claim 14, wherein the timestamp value indicates indicating when the Generic Routing Encapsulation (GRE) packet BCMCS content frame is transmitted, from the PCF to the first lower nodes of the PCF, the first lower nodes being connected downstream of the PCF.

16. The method according to claim 14, wherein determining whether the GRE packet BCMCS content frame received from the PCF is valid includes determining that the received GRE packet BCMCS content frame is valid if a transmission delay of the received GRE packet BCMCS content frame, calculated based on the timestamp value thereof, is smaller than a predetermined time length.

17. The method according to claim 14, wherein the transmission of the GRE packet BCMCS content frame is synchronized by transmitting the GRE packet BCMCS content frame after waiting a predetermined time length.

18. The method according to claim 16, wherein the predetermined time length is twice a period, at intervals of which the GRE packet BCMCS content frame is transmitted from the PCF to the first lower nodes.

19. The method according to claim 17, wherein the predetermined time length is twice a period, at intervals of which the GRE packet BCMCS content frame is transmitted from the PCF to the first lower nodes.

20. A system transmitting a Broadcast/Multicast Service (BCMCS) content frame in a mobile communication system, comprising:
   a BCMCS server adapted to transmit the BCMCS content frame;
   a Packet Data Service Node (PDSN) adapted to receive the BCMCS content frame from the BCMCS server, and transmit a corresponding Generic Routing Encapsulation (GRE) packet BCMCS content frame, including a sequence number and a timestamp value;
   a first lower nodes adapted to determine whether the GRE packet BCMCS content frame received from the PDSN is valid, based on the sequence number included in the received GRE packet BCMCS content frame, and, if the GRE packet BCMCS content frame is valid, transmit the GRE packet BCMCS content frame from each of the first lower nodes to second lower nodes connected downstream of each of the first lower nodes, while synchronizing the transmission of the GRE packet BCMCS content frame, based on the timestamp value included in the GRE packet BCMCS content frame.

21. The system according to claim 20, wherein the timestamp value indicates when the GRE packet BCMCS content frame is transmitted, from the PDSN to first lower nodes of the PDSN, the first lower nodes being connected down stream of the PDSN.

22. The system according to claim 20, wherein the sequence number and the timestamp value are included in a GRE header of the GRE packet BCMCS content frame.

23. The system according to claim 20, wherein the lower nodes are further adapted to determine that the received GRE packet BCMCS content frame is valid if a transmission delay of the received GRE packet BCMCS content frame, calculated based on the timestamp value thereof, is smaller than a predetermined time length.

24. The system according to claim 20, wherein the transmission of the GRE packet BCMCS content frame is synchronized by transmitting the GRE packet BCMCS content frame after waiting a predetermined period.

* * * * *